(12) United States Patent
Lupke et al.

(10) Patent No.: US 12,533,831 B2
(45) Date of Patent: Jan. 27, 2026

(54) SYSTEM AND METHOD FOR MOLD BLOCK EXCHANGE ON RETURN TRACK

(71) Applicants: Manfred A. A. Lupke, Thornhill (CA); Stefan A. Lupke, Thornhill (CA)

(72) Inventors: Manfred A. A. Lupke, Thornhill (CA); Stefan A. Lupke, Thornhill (CA)

( * ) Notice: Subject to any disclaimer, the term of this patent is extended or adjusted under 35 U.S.C. 154(b) by 140 days.

(21) Appl. No.: 18/573,919

(22) PCT Filed: Jun. 28, 2022

(86) PCT No.: PCT/CA2022/051030
§ 371 (c)(1),
(2) Date: Dec. 22, 2023

(87) PCT Pub. No.: WO2023/272382
PCT Pub. Date: Jan. 5, 2023

(65) Prior Publication Data
US 2024/0316828 A1  Sep. 26, 2024

Related U.S. Application Data

(60) Provisional application No. 63/202,862, filed on Jun. 28, 2021.

(51) Int. Cl.
*B29C 33/30* (2006.01)
*B29C 33/34* (2006.01)
(Continued)

(52) U.S. Cl.
CPC .......... *B29C 33/301* (2013.01); *B29C 33/303* (2013.01); *B29C 33/34* (2013.01);
(Continued)

(58) Field of Classification Search
CPC ........ B29C 33/34; B29C 48/265; B29C 53/30
See application file for complete search history.

(56) References Cited

U.S. PATENT DOCUMENTS 4,325,685 A  4/1982 Lupke et al.
4,504,206 A  3/1985 Lupke
(Continued)

FOREIGN PATENT DOCUMENTS

CA  2271395 A1  11/2000
CA  2485851 A1  5/2005
(Continued)

OTHER PUBLICATIONS

Canadian Intellectual Property Office, Written Opinion for PCT/CA2022/051030, Sep. 1, 2022, pp. 1-5.
(Continued)

*Primary Examiner* — JaMel M Nelson
*Assistant Examiner* — Virak Nguon
(74) *Attorney, Agent, or Firm* — CAHN & SAMUELS, LLP

(57) ABSTRACT

A system and method for replacing or substituting mold blocks in a corrugator, the corrugator comprising first and second tracks for carrying respective chains of mold blocks, each of the tracks comprising return tracks, wherein the system advances replacement mold blocks towards the return tracks to displace corresponding mold blocks in the mold block chains while the corrugator is in production and while the mold block chains are in motion.

12 Claims, 4 Drawing Sheets

(51) Int. Cl.
    *B29C 48/13*    (2019.01)
    *B29C 53/30*    (2006.01)
    *B29L 23/18*    (2006.01)
(52) U.S. Cl.
    CPC .............. *B29C 53/30* (2013.01); *B29C 48/13* (2019.02); *B29L 2023/18* (2013.01)

(56) References Cited

U.S. PATENT DOCUMENTS

| | | | |
|---|---|---|---|
| 4,681,526 | A | 7/1987 | Lupke |
| 6,485,286 | B1 * | 11/2002 | Hoffmann ............... B29C 48/13 425/185 |
| 9,969,119 | B2 | 5/2018 | Lupke et al. |
| 2002/0113339 | A1 | 8/2002 | Starita |
| 2009/0091055 | A1 | 4/2009 | Hegler |
| 2017/0217080 | A1 | 8/2017 | Lupke et al. |
| 2019/0168474 | A1 * | 6/2019 | Stavariu ................. B29C 48/09 |

FOREIGN PATENT DOCUMENTS

| | | | |
|---|---|---|---|
| CA | 3148003 | A1 | 2/2021 |
| DE | 102019212130 | A1 | 2/2021 |

OTHER PUBLICATIONS

Canadian Intellectual Property Office, International Search Report for PCT/CA2022/051030, Sep. 1, 2022, pp. 1-3.
European Patent Office, extended European Search Report for EPO App. No. EP 22 831 096.7, May 14, 2025, pp. 1-6.

* cited by examiner

SYSTEM AND METHOD FOR MOLD BLOCK EXCHANGE ON RETURN TRACK

CROSS REFERENCE TO PRIOR APPLICATIONS

This application claims priority under the Paris Convention to U.S. Application No. 63/202,862, filed Jun. 28, 2021.

FIELD OF THE DESCRIPTION

The present description relates to systems and methods for combination with corrugators used for producing corrugated pipe. More particularly, the present description relates to systems and methods that permit the exchange of mold blocks in a pipe corrugator while the corrugator is in operation.

BACKGROUND

Systems for producing corrugated pipes, also known as corrugators, are known in the art. Generally, such corrugators include two series of mold blocks, wherein pairs of mold blocks are brought together to define a moving mold tunnel. The mold tunnel is aligned with an extruder through which molten plastic material is injected into the tunnel. The extruded plastic conforms to the shape of the interior surfaces of the mold blocks and is advanced through the mold tunnel along with the mold blocks. During this phase, the extruded plastic is cooled thus forming the pipe.

The series of mold blocks are provided, and carried on, endless tracks that are adapted to rotate in opposite directions. In this way, the mold blocks are brought together to form the mold tunnel and moved apart at the end of the tunnel. The tracks return the mold blocks over opposite sides of the tracks. In one aspect, the tracks are vertically arranged, with one track positioned above the other.

Examples of corrugators comprising moving mold blocks are provided in U.S. Pat. Nos. 9,969,119; 4,504,206; and 4,681,526. The entire contents of such references are incorporated herein by reference as if set forth in their entirety.

Generally, the mold blocks used in the manufacture of corrugated pipe have a common interior profile, whereby an elongate pipe is formed that conforms to such profile. In certain instances, however, it is desired for a section of the pipe to be formed with a different profile. This would occur, for example, where a pipe is to be formed with a coupling at one end, to enable connection with an adjacent pipe segment. In such cases, it will be understood that different mold blocks, i.e., having a different internal profile, must be used to result in the desired form on the pipe. Thus, in order to accommodate such change in pipe profile, the operation of corrugator must be stopped and the necessary mold blocks must be exchanged. Following formation of the coupling, the corrugator must again be stopped to allow the exchanged mold blocks to be replaced with the original blocks. This process will be understood to be time consuming, resulting in increased down-time of the corrugator and loss of productivity.

There exists a need for an improved system and method for exchanging mold blocks in a corrugator.

SUMMARY OF THE DESCRIPTION

In one aspect, the present description provides a system and method for exchanging mold blocks in a pipe corrugator. In particular, the system and method allow for the exchanging of mold blocks while the corrugator is in production producing pipe. In one aspect, replacement mold blocks are urged into position while the mold block chain is in motion, and displacing existing mold blocks on the chain.

In one aspect, there is provided an apparatus for mold block exchange on a corrugator, the corrugator having a frame and a first track for carrying a plurality of first mold blocks and a second track for carrying a plurality of second mold blocks, the first and second tracks being generally parallel with each other, each of the first and second tracks comprising a respective production track and a respective return track, wherein the apparatus comprises:
  a pair of first rails secured to the first track, the first rails being generally parallel to the first track and provided on opposite sides thereof;
  a pair of second rails secured to the second track, the second rails being generally parallel to the second track and provided on opposite sides thereof;
  a first table aligned with the first return track and being moveably supported by the first rails;
  a second table aligned with the second return track and being moveably supported by the second rails;
  each of the first and second tables comprising a respective pair of staging platforms provided on opposite sides of the respective first return track and second return track, each of the staging platforms being aligned with the respective return tracks and being adapted to support one or more replacement mold blocks;
  each of the staging platforms including a push arm adapted to advance the one or more replacement mold blocks and to load the one or more replacement mold blocks on to the respective return track.

In another aspect, there is provided a method of exchanging mold blocks provided on a corrugator, the corrugator having a first track for carrying a first mold block chain comprising a plurality of first mold blocks and a second track for carrying a second mold block chain comprising a plurality of second mold blocks, the first and second tracks being generally parallel with each other, each of the first and second tracks comprising a respective production track and a respective return track, wherein the method comprises:
  staging one or more first replacement mold blocks adjacent to the first return track and on a first staging surface aligned with the first return track;
  staging one or more second replacement mold blocks adjacent to the second return track and on a second staging surface aligned with the second return track;
  advancing the first and second replacement mold blocks towards the first and second return tracks to displace corresponding mold blocks on the first and second mold block chains;
  wherein the mold block displacement is conducted while the mold block chains are in motion.

In one aspect, the displacement of the mold blocks occurs simultaneously with the movement of the mold block chains.

BRIEF DESCRIPTION OF THE FIGURES

The features of certain embodiments will become more apparent in the following detailed description in which reference is made to the appended figures wherein.

DETAILED DESCRIPTION

As used herein, the term "mold block" will be understood to mean a body having an internal cavity defining a profile corresponding to generally one half of the outer surface of a corrugated pipe. Thus, two mold blocks, when aligned combine to form a mold for defining the outer surface of the pipe.

The term "mold tunnel" will be understood to mean a plurality of mold blocks arranged in alignment and within which the pipe is formed. A mold tunnel, in the context of the corrugators described herein will be understood as "moving" as the mold blocks are advanced.

The terms "comprise", "comprises", "comprised" or "comprising" may be used in the present description. As used herein (including the specification and/or the claims), these terms are to be interpreted as open-ended terms and as specifying the presence of the stated features, integers, steps or components, but not as precluding the presence of one or more other feature, integer, step, component or a group thereof as would be apparent to persons having ordinary skill in the relevant art. Thus, the term "comprising" as used in this specification means "consisting at least in part of". When interpreting statements in this specification that include that term, the features, prefaced by that term in each statement, all need to be present but other features can also be present. Related terms such as "comprise" and "comprised" are to be interpreted in the same manner.

The phrase "consisting essentially of" or "consists essentially of" will be understood as generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open-ended term, such as "comprising" or "including", it will be understood that direct support should be afforded also to "consisting essentially of" language as well as "consisting of" language as if stated explicitly and vice versa. In essence, use of one of these terms in the specification provides support for all of the others.

The term "and/or" can mean "and" or "or".

Unless stated otherwise herein, the articles "a" and "the", when used to identify an element, are not intended to constitute a limitation of just one and will, instead, be understood to mean "at least one" or "one or more".

Figure 1:
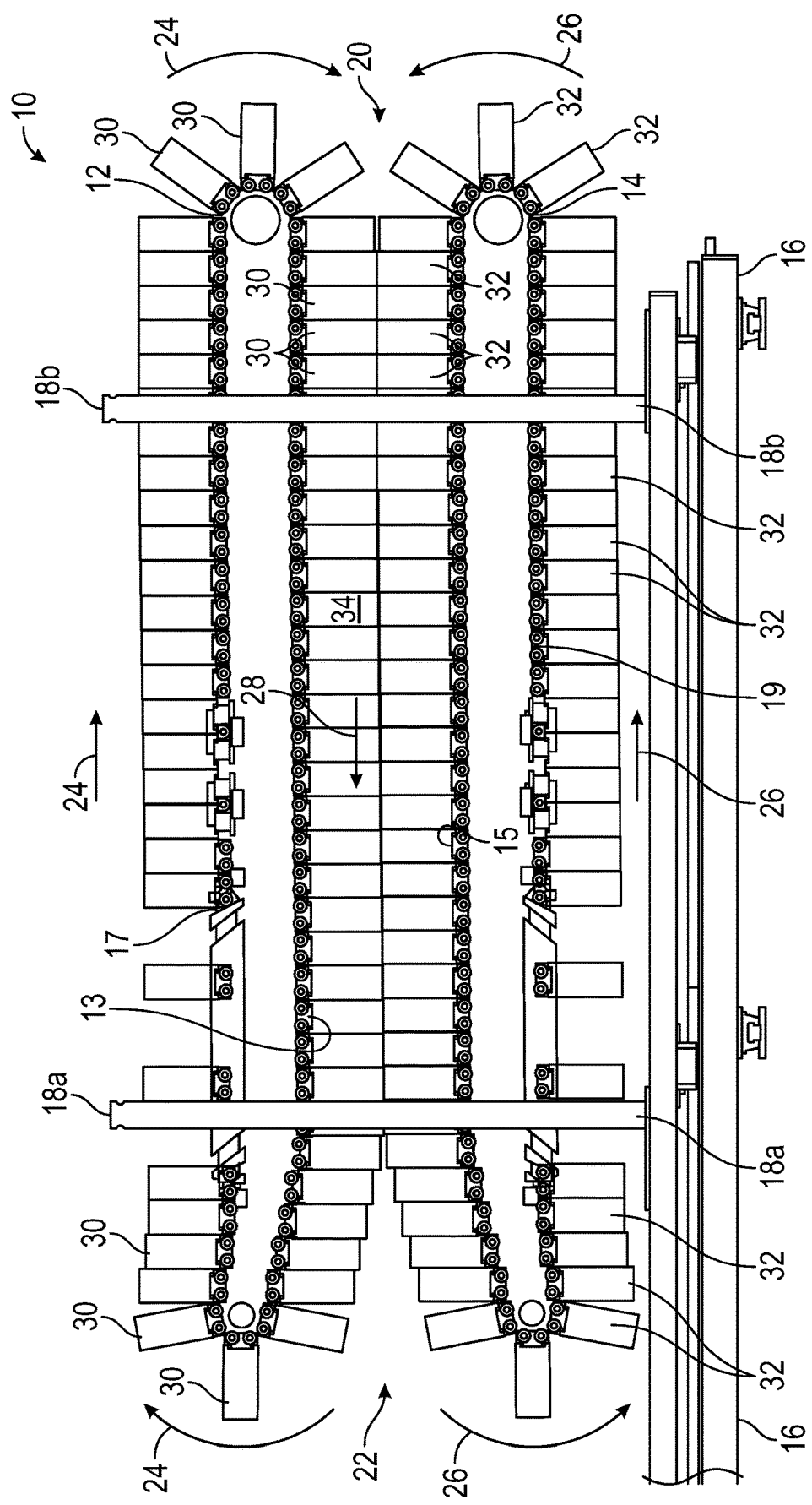
FIG. 1 is a side elevation view of a pipe corrugator.

FIG. 1 illustrates a corrugator as known in the art. The corrugator 10 comprises a first track 12 and a second track 14, which are mounted on a frame 16. In the aspect shown, the tracks 12 and 14 are mounted on pillars 18a and 18b, whereby the first track 12 is arranged vertically above the second track 14 and wherein the longitudinal axes of the tracks 12 and 14 are parallel. The tracks 12, 14 extend between a first end 20 and a second end of the corrugator. As illustrated by arrows 24 and 26, and according to the illustrated aspect of the description, the first track is adapted to rotate in a clockwise direction 24, whereas the second track is adapted to rotated in a counter clockwise direction 26.

As also illustrated, and as will be described further below, the first track 12 comprises a first production track 13 and the second track 14 comprises a second production track 15. The production tracks 13 and 15 face each other. In addition, the first track 12 comprises a first return track 17 that faces away from the second track 14 and, similarly, the second track 14 has a return track 19 that faces away from the first track 12.

Each of the tracks 12, 14 carry, or support, a plurality of mold blocks, with the mold blocks being moved along the tracks. As shown in FIG. 1, first track 12 carries a plurality of first mold blocks 30, and the second track 14 carries a plurality of second mold blocks 32. Each of the plurality of mold blocks forms a mold block chain, wherein the first mold blocks 30 form a first mold block chain associated with the first track 12, and the second mold blocks 32 form a second mold block chain associated with the second track 14. The present description is not limited to any particular number of mold blocks. As will be understood by persons skilled in the art, the number and size of mold blocks will vary depending on the need.

The mold blocks 30 and 32 are illustrated herein in schematic form for ease of reference. It will be understood that the presently described system may be used with any known mold blocks. In particular, the present description is not limited to mold blocks having any specific mold profile.

The mold blocks 30 and 32 are moved along the respective tracks in the directions 24 and 26, respectively. As shown in FIG. 1, as the mold blocks 30 and 32 are moved around the first end 20 of the corrugator, that is, moving from the respective return tracks 17, 19 and on to the respective production tracks 13 and 15, they are brought into alignment to form a mold tunnel 34, which comprises the mold for forming the desired corrugated pipe (not shown). At this point, the mold blocks 30 and 32 are moved in a common direction as shown by arrows 28. The mold blocks 30 and 32 are retained in alignment for the length of the mold tunnel 34. As discussed above, molten plastic from an extruder (not shown) is injected into the mold tunnel at location proximal to the first end 20 and, as known to persons skilled in the art, the molten plastic assumes the profile defined by the interior surfaces of the mold blocks 30, 32. In this regard, the interior surfaces of mold blocks 30 and 32 are provided with a profile that corresponds with the corrugations to be formed on the outer surface on the pipe. As also known in the art, the length of the mold tunnel will be selected in such a manner as to allow the molten plastic to set, thereby forming the pipe.

As discussed herein, and as known in the art, the production tracks 13, 15 serve to align mold blocks together to form the mold tunnel 34, while the return tracks 17, 19 serve to return the mold blocks from the second end 22 of the corrugator to the first end 20 thereof. As known in the art, while on the return tracks, the mold blocks are cooled. In one aspect, while the mold blocks are carried on the respective return tracks 17, 19, adjacent blocks may be separated from each other by a distance to accelerate the cooling process.

In general, the mold blocks 30 and 32 have a common mold profile, whereby a continuous length of pipe may be formed with a consistent outer profile. The pipe may be cut to desired lengths after being formed.

In some instances, however, the pipe being formed may require a different exterior profile at a particular section along its length. Such profile may, for example, comprise a coupling formed at an end of a length of pipe, which enables one pipe segment to be connected, or coupled to an adjacent pipe segment, when the pipe is laid. Couplings of this type are known in the art. As will be understood, when forming such coupling at the end of a given length of pipe, a different set of mold blocks would be required. The present description provides a system and method for replacing one or more discrete mold blocks on a mold block chain with mold blocks having the required profile. In a preferred aspect, the described system and method permit such mold block replacement to take place while the corrugator remains in production. For this purpose, the system and method described herein comprise a corrugator, such as known in the art, that is provided with a waiting station for holding the desired replacement mold blocks and a means for advancing such replacement mold blocks into the required sections along the mold block chains prior to the mold blocks forming the mold tunnel. In this regard, the mold block replacement takes place while the mold blocks are on the respective first and second return tracks 17 and 19.

Figure 2:
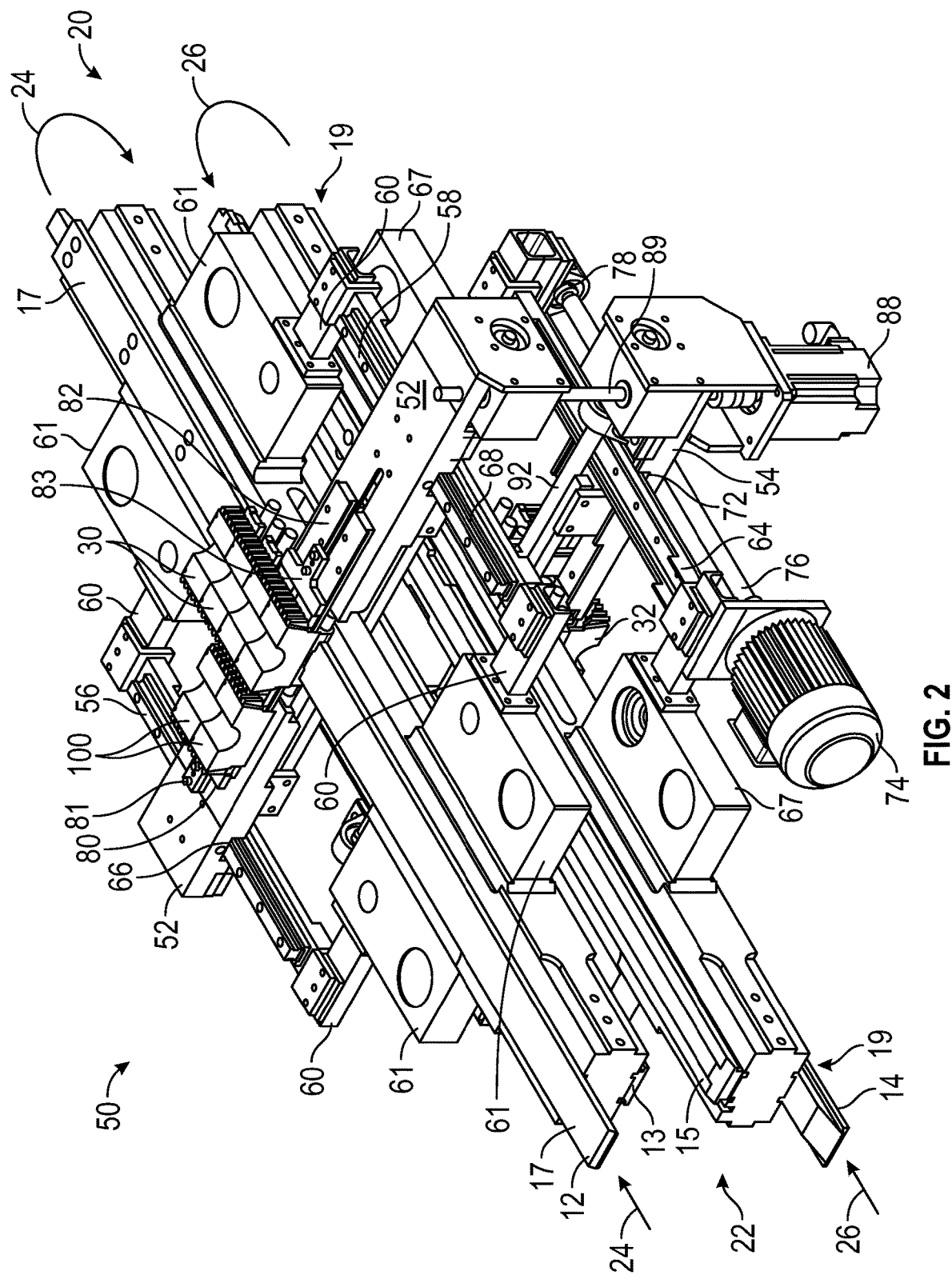
FIG. 2 is top, left side perspective view of a corrugator comprising the system described herein.
Figure 3:
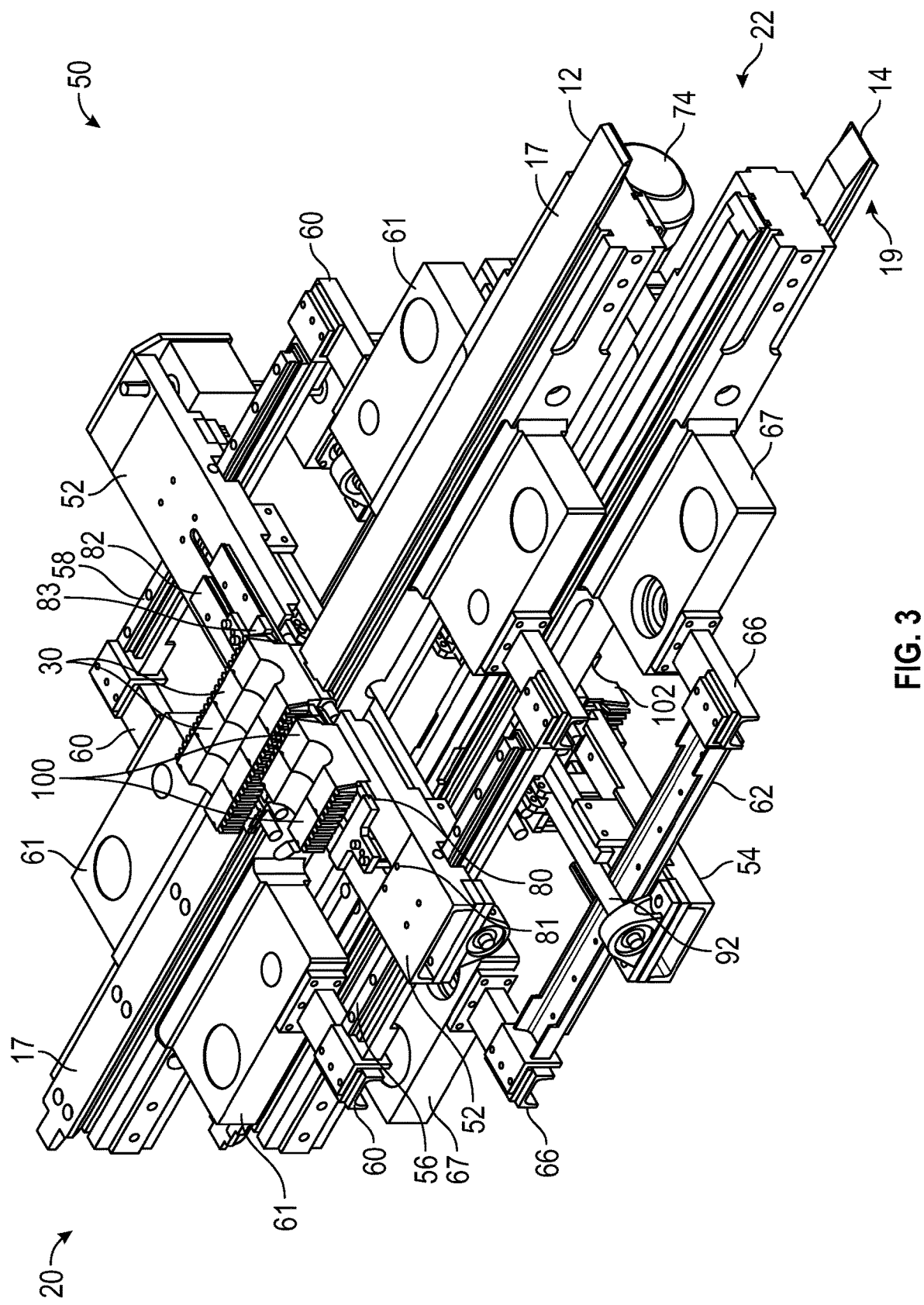
FIG. 3 is top, right side perspective view of a corrugator comprising the system described herein.
Figure 4:
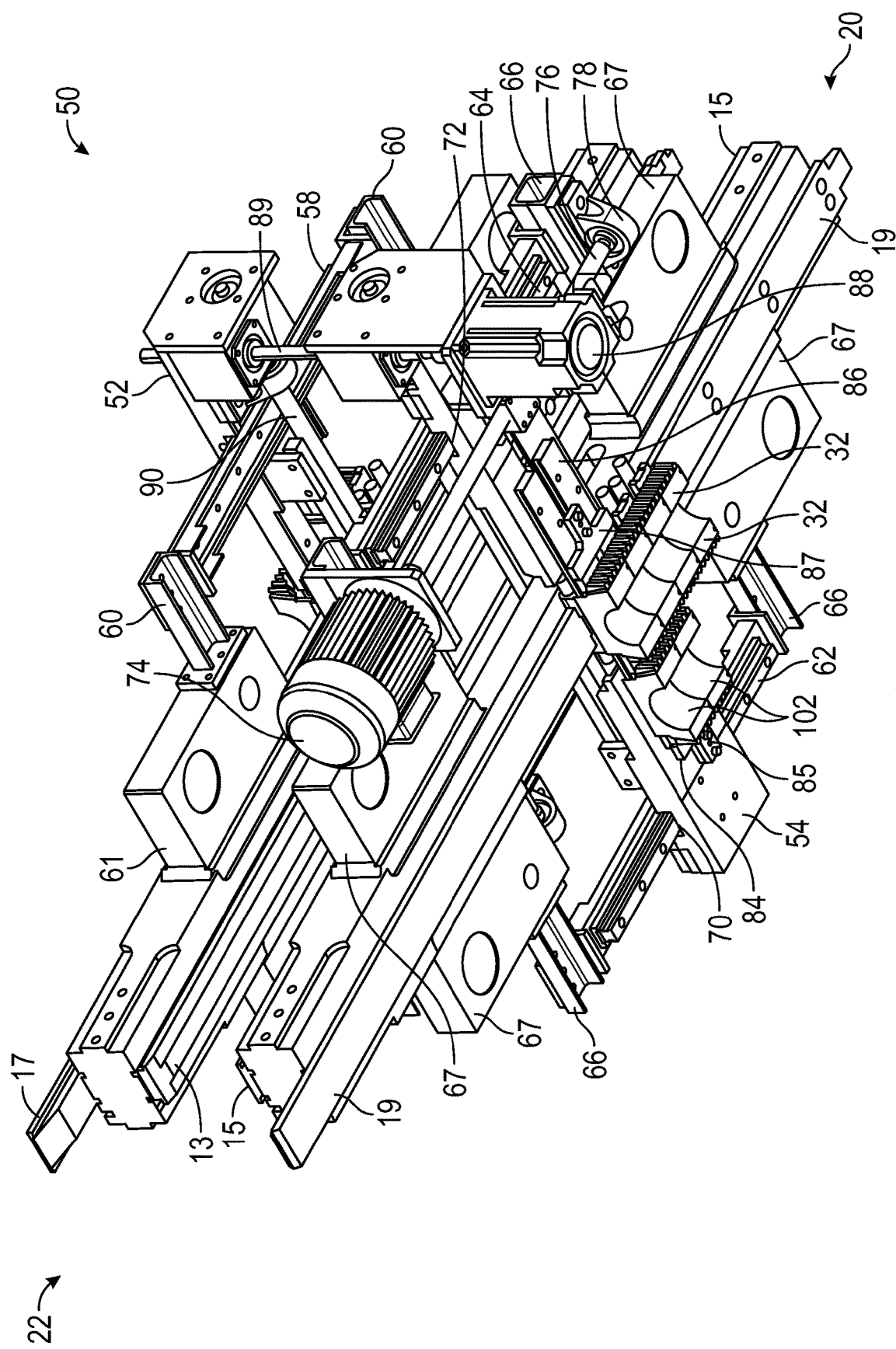
FIG. 4 is bottom, left side perspective view of a corrugator comprising the system described herein.

As shown in FIGS. 2 to 4, the system 50 is adapted to cooperate with the first and second return tracks 17 and 19 of the respective first and second tracks 12 and 14. The system comprises two tables 52 and 54, wherein, as discussed below, a first table 52 is adapted to cooperate with the first return track 17 and a second table 54 is adapted to cooperate with the second return track 19. The tables 52 and 54 are mounted on respective rails, which are mounted to opposite sides of the respective first and second return tracks 17 and 19. The rails extend generally parallel with the longitudinal axes of the return tracks 17 and 19 and are mounted so as to be spaced away from the opposite sides of the tracks 17 and 19. In particular, the first table 52 is mounted on rails 56 and 58, which are secured by means of support brackets 60 and respective support blocks 61 to opposite sides of the frame supporting the first track 12. Similarly, the second table 54 is mounted on rails 62 and 64, which are secured by support brackets 66 and respective support blocks 67 to opposite sides of the frame supporting the second track 14. As also seen in FIGS. 2 to 4, the tables 52 and 54 are preferably vertically aligned with return tracks 17 and 19, respectively. The purpose of such alignment is discussed below.

While FIGS. 2 to 4 are illustrated with brackets 60, 66 and associated support blocks 61, 67 being used to secure the respective rails to the tracks 12 and 14, it will be understood that any other securing means may be used for such purpose. The present description is not limited to any particular means for securing the rails 56, 58, 62, and 64.

The tables 52 and 54 are movably mounted on the rails, whereby each table is adapted to be translated along the respective rails in a direction parallel with such rails. In one aspect, the tables 52 and 54 are slidably mounted on the respective rails for this purpose. In this aspect, as illustrated in FIGS. 2 to 4, the tables 52 and 54 are mounted so as to be reversibly slidable along the rails in a direction parallel with the longitudinal axes of the return tracks 17 and 19. In one aspect, this slidability is achieved with the tables having grooves for engaging the respective rails. For example, as shown in FIG. 2, first table 52 is provided with grooves 66 and 68, which are adapted to receive the rails 56 and 58, respectively. Similarly, as shown in FIG. 4, second table 54 is provided with grooves 70 and 72, which are adapted to receive the rails 62 and 64, respectively. It will be understood that other components may be incorporated in the present system to facilitate the longitudinal movement of the tables 52 and 54 along the respective rails. For example, the grooves and/or the rails may be provided with bearings, rollers, wheels, gears, or other such components to allow or facilitate the tables to slide along the rails.

A table drive means, such as a travel motor 74 is provided for driving the movement of the tables 52 and 54 along the respective rails. As shown, the travel motor 74, according to one aspect, includes a drive shaft 76 that extends from the motor 74 to a bearing 78. The drive shaft 76 is in turn connected to the tables 52 and 54, whereby actuation of the motor 74 causes translation of the tables 52 and 54 along the respective rails. In one aspect, the drive shaft 76 is connected to the tables 52 and 54 with a gear and screw mechanism as known in the art. The present description is not limited to any particular means of connecting the motor 74 to the tables 52 and 54. The travel motor 74 is reversible, whereby the tables 52 and 54 may be reciprocally moved along the respective rails. In one aspect, the tables 52 and 54 are linked to each other, in which case the travel motor 74 need only be connected to one of the tables and movement of such table translates to movement of the other table. As will be understood, such an arrangement would be preferred in order to synchronize the movement of tables 52 and 54. In an alternate aspect, each table may be provided with separate motors or other such drive means while achieving the desired synchronous movement of the tables 52 and 54.

Each of the first and second tables 52 and 54 are provided with respective staging platforms for the staging and receiving of mold blocks during the replacement process. As shown in FIGS. 2 and 3, the first table 52 is provided with a first staging platform 80 on one side of the return track 17 and a second staging platform 82 on the opposite side of the return track 17. As shown in FIG. 4, the second table 54 is provided with a first staging platform 84 on one side of the return track 19 and a second staging platform 86 on the opposite side of the return track 19. The surfaces of the staging platforms are adapted to be generally coplanar with the surface of the respective return track, as will be discussed further below. Each of the staging platforms extend a distance generally perpendicularly away from the respective return track. As will be discussed below, this distance allows for mold blocks to be retained or staged away from the return track, pending the replacement step.

Each of the staging platforms is provided with a respective push arm. Thus, as shown, staging platforms 80 and 82 are provided with respective push arms 81 and 83, and staging platforms 84 and 86 are provided with respective push arms 85 and 87. The push arms 81, 83, 85, and 87 are adapted to be reciprocally moved in a direction generally perpendicular to the longitudinal axes of the first and second return tracks 17, 19. Preferably, the push arms are driven by push arm drive means, such as a loading motor 88. In this regard, the loading motor 88 is connected to a drive shaft 89 that in turn is connected to subordinate drive shafts 90 and 92. Subordinate drive shaft 90 is adapted to engage and drive push arms 81 and 83, while subordinate drive shaft 92 is adapted to engage and drive push arms 85 and 87. In this arrangement, the associated push arms are adapted to move in the same lateral direction, whereby when push arm 81 is moved in a direction towards the return track 17, the opposite push arm 83 is moved away from track 17, and vice versa. Similarly, as push arm 85 is moved in a direction towards return track 19, the opposite push arm 87 is moved away from track 19, and vice versa. As noted above, it is preferred that the push arms are collectively driven by a single motor in order to synchronize their movements. However, it will be understood that more than one motor or drive means may be utilized to achieve the same synchronization.

The operation of the subject system will now be described. As discussed above, the corrugator includes a travelling mold block chain associated with each of tracks 12 and 14. Respective portions of such chains are illustrated as first mold blocks 30 and second mold blocks 32 in FIGS. 2 to 4. In these figures, the mold blocks 30 and 32 are illustrated on their respective return tracks 17 and 19. In an aspect of the description, one or more replacement mold blocks are provided on a respective staging platform. For the present description, the one or more replacement mold blocks may be referred to as a "set" for convenience. As shown in FIGS. 2 and 3, a first set of replacement mold blocks 100 10 provided on staging platform 80 and such replacement mold blocks are retained on the platform until the mold block chain is advanced to the position where the replacement mold blocks 100 are to be inserted into the mold block chain. As discussed above, the replacement mold blocks 100 may comprise mold blocks having a mold profile designed to form a coupling on the pipe. It will be understood that although two replacement mold blocks 100 are illustrated in FIGS. 2 and 3, any number of such replacement mold blocks may be provided.

As shown in FIGS. 2 and 3, the replacement mold blocks 100 are positioned on the staging platform 80 and in between the return track 17 and the pusher arm 81. When the mold block replacement is to occur, the loading motor 88 is actuated whereby the pusher arm 81 is advanced in a direction towards the return track 17. Such movement thereby results in sliding movement of the replacement mold blocks 100 against respective mold blocks 30 that are on the return track 17. As the pusher arm 81 is advanced, the replacement mold blocks 100 displace the respective mold blocks 30 forming part of the mold block chain. This movement forces the displaced mold blocks 30 onto the opposing staging platform 82, on an opposite side of the return track 17, and the replacement mold blocks 100 are thereby joined into to the mold block chain to participate in the forming of the pipe with the desired profile. As would be understood, as the displaced mold blocks 30 are moved onto staging platform 82 they are brought into contact with pusher arm 83, which is moved in a direction away from the return track 17 by the loading motor 88.

As shown in FIGS. 3 and 4, and as will be understood, a second set of replacement mold blocks 102 would be provided on staging platform 84 associated with return track 19, wherein the second set of mold blocks 102 would correspond with the first set of replacement mold blocks 100 for the purpose of the molding process. As discussed above, the advancement of the pusher arm 85 associated with the platform 84 is synchronized with the advancement of pusher arm 81. Accordingly, the required mold blocks 32 are substituted with second set of replacement mold blocks 102 that correspond in mold profile and position with first replacement mold blocks 100 discussed above.

In a preferred aspect of the system described above, the above-mentioned substitution of mold blocks 30 and 32 with corresponding replacement mold blocks occurs while the corrugator is in operation. Thus, in this scenario, the above-mentioned mold block substitution takes place while the mold block chains on each of tracks 12 and 14 are in motion. To accommodate for this motion, the tables 52 and 54 are provided on the respective rails 56, 58 and 62, and are driven by motor 74, as described above. The tables 52 and 54 are initially positioned proximal to the second end 22 of the corrugator. As the location for the mold block exchange is advanced towards the tables 52 and 54, the motor 74 synchronizes the translation of the tables on the rails so that the tables, with the replacement mold blocks thereon, are moved at the same speed as the mold block chain and are advanced in a direction towards the first end 20 of the corrugator. The velocity of the tables 52 and 54 would also be synchronized with that of the mold block chains. In this way, there would be no relative longitudinal movement (i.e., movement in the direction of the return tracks) between the replacement mold blocks and the mold blocks on the mold block chain. Accordingly, the pusher arms can be advanced to simultaneously displace and replace the mold blocks on the chain in the manner described above. Once the mold blocks are substituted, the motor 74 is again actuated to return the tables 52 and 54 to their initial position proximate to the second end 22 of the corrugator.

It will be understood that when forming, for example, a coupling on a long section of pipe, the requirement for the coupling mold blocks may not be needed for each cycle of rotation of the mold block chains. Accordingly, once the replacement mold blocks 100 have completed the formation of the coupling and are returned on return tracks 17 and 19 towards the tables 52 and 54, the replacement mold blocks may be removed and substituted with the original mold blocks 30 and 32 that were moved to staging platforms 82 and 86, and against respective pusher arms 83 and 87, when the replacement mold blocks were connected to the mold block chains. To accomplish this, the loading motor 88 is actuated again, but in the opposite direction. This causes pusher arms 83 and 87, provided on respective staging platforms 82 and 86, to be advanced towards the respective return tracks 17 and 19. Consequently, the previously displaced mold blocks 30 and 32 are advanced into the respective mold block chains, thereby displacing the replacement mold blocks that were previously connected. Thus, the replacement mold blocks are once again returned to the staging platforms and ready to be incorporated into the mold block chain in the subsequent cycle. It will be understood that this sequence of replacement and reversal of replacement of mold blocks may occur any desired number of times to form the required pipe segments.

In the above discussion, reference was made to using the subject system and method for temporarily substituting certain mold blocks for forming a unique feature on the pipe. Such feature may be, for instance, a coupling. It will be understood that the description is not limited to any particular mold block configuration and the replacement mold blocks may be used to form any desired feature or profile on the pipe. It will also be understood that the present system and method may be employed to replace mold blocks with mold blocks of the same profile, such as may be needed when a mold block is damaged or otherwise needs to be replaced.

In the above description, it has been contemplated that a mold block exchange would occur once each cycle or once every two cycles etc. However, in some instances, it may be necessary to alter the profile of the pipe more than once during a given mold block cycle. This may occur, for example, where short pipe sections with couplings are to be formed. In such case, the pipe length may be less than the length of the mold block tunnel 34. For this purpose, the corrugator may be provided with more than one of the systems described above. In such case, a first system may be activated to replace a first set of mold blocks with a first set of replacement mold blocks and a second system, located a distance away from the first system, may be activated to replace a second set of mold blocks with a second set of replacement mold blocks.

The above description has referred to a single mold block exchange occurring per mold block chain cycle. It will, however, be understood that in other aspects, the presently described apparatus and method may be adapted to allow for more than one variation in pipe profile to be provided on a section of pipe. For example, a pipe may be formed with a coupling at one end and another variation in the profile along its length.

In the above description, it will be understood that controllers and the like will be included to coordinate and synchronize the drive means used to move the tables and the push arms.

Although the above description includes reference to certain specific embodiments, various modifications thereof will be apparent to those skilled in the art. Any examples provided herein are included solely for the purpose of illustration and are not intended to be limiting in any way. Any drawings provided herein are solely for the purpose of illustrating various aspects of the description and are not intended to be drawn to scale or to be limiting in any way. The scope of the claims appended hereto should not be limited by the preferred embodiments set forth in the above description but should be given the broadest interpretation consistent with the present specification as a whole.

We claim:

1. An apparatus for mold block exchange on a corrugator, the corrugator having a frame and a first track for carrying a plurality of first mold blocks and a second track for carrying a plurality of second mold blocks, the first and second tracks being generally parallel with each other, each of the first and second tracks comprising a respective production track and a respective return track, wherein the apparatus comprises:
    a pair of first rails secured to the first track, the first rails being generally parallel to the first track and provided on opposite sides thereof;
    a pair of second rails secured to the second track, the second rails being generally parallel to the second track and provided on opposite sides thereof;
    a first table aligned with the first return track and being moveably supported by the first rails;
    a second table aligned with the second return track and being moveably supported by the second rails;
    each of the first and second tables comprising a respective pair of staging platforms provided on opposite sides of the respective first return track and second return track, each of the staging platforms being aligned with the respective return tracks and being adapted to support one or more replacement mold blocks;
    each of the staging platforms including a push arm adapted to advance the one or more replacement mold blocks and to load the one or more replacement mold blocks on to the respective return track.

2. The apparatus of claim 1, wherein the pair of first rails extend in a direction parallel to a longitudinal axis of the first track, and wherein the pair of second rails extend in a direction parallel to a longitudinal axis of the second track.

3. The apparatus of claim 2, wherein the first and second rails are connected to the frame of the corrugator and are distanced from the respective first and second tracks.

4. The apparatus of claim 3, further comprising a first drive means for reversibly moving the first and second tables along the respective first and second rails.

5. The apparatus of claim 4, wherein the first drive means is adapted to synchronize movement of the first and second tables with the movement of the first and second return tracks.

6. The apparatus of claim 5, further comprising a second drive means for advancing the push arms.

7. The apparatus of claim 1, wherein the first and second rails are connected to the frame of the corrugator and are distanced from the respective first and second tracks.

8. The apparatus of claim 1, further comprising a first drive means for reversibly moving the first and second tables along the respective first and second rails.

9. The apparatus of claim 8, wherein the first drive means is adapted to synchronize movement of the first and second tables with the movement of the first and second return tracks.

10. The apparatus of claim 8, further comprising a second drive means for advancing the push arms.

11. A method of exchanging mold blocks provided on a corrugator, the corrugator having a first track for carrying a first mold block chain comprising a plurality of first mold blocks and a second track for carrying a second mold block chain comprising a plurality of second mold blocks, the first and second tracks being generally parallel with each other, each of the first and second tracks comprising a respective production track and a respective return track, wherein the method comprises:
    staging one or more first replacement mold blocks adjacent to the first return track and on a first staging surface aligned with the first return track and wherein the first staging surface is moveably supported by a pair of first rails secured to opposite sides of the first track and being generally parallel with the first track;
    staging one or more second replacement mold blocks adjacent to the second return track and on a second staging surface aligned with the second return track and wherein the second staging surface is moveably supported by a pair of second rails secured to opposite sides of the second track and being generally parallel with the second track;
    advancing the first and second replacement mold blocks towards the first and second return tracks to displace corresponding mold blocks on the first and second mold block chains;
    wherein the mold block displacement is conducted while the mold block chains are in motion.

12. The method of claim 11, wherein the first and second staging surfaces are synchronously moved with the first and second return tracks during the mold block displacement.

* * * * *